Figure 11:
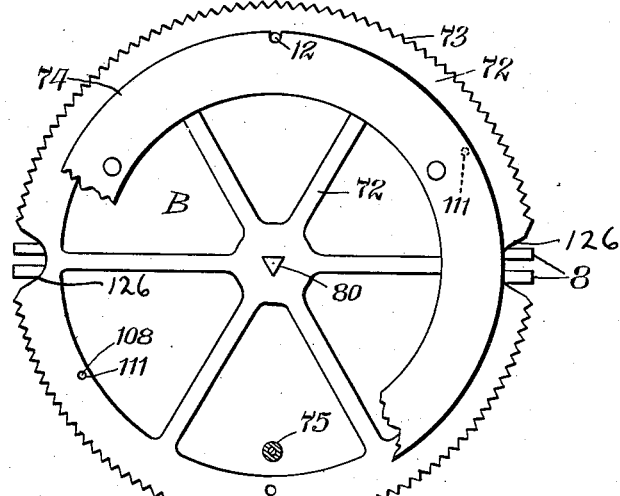

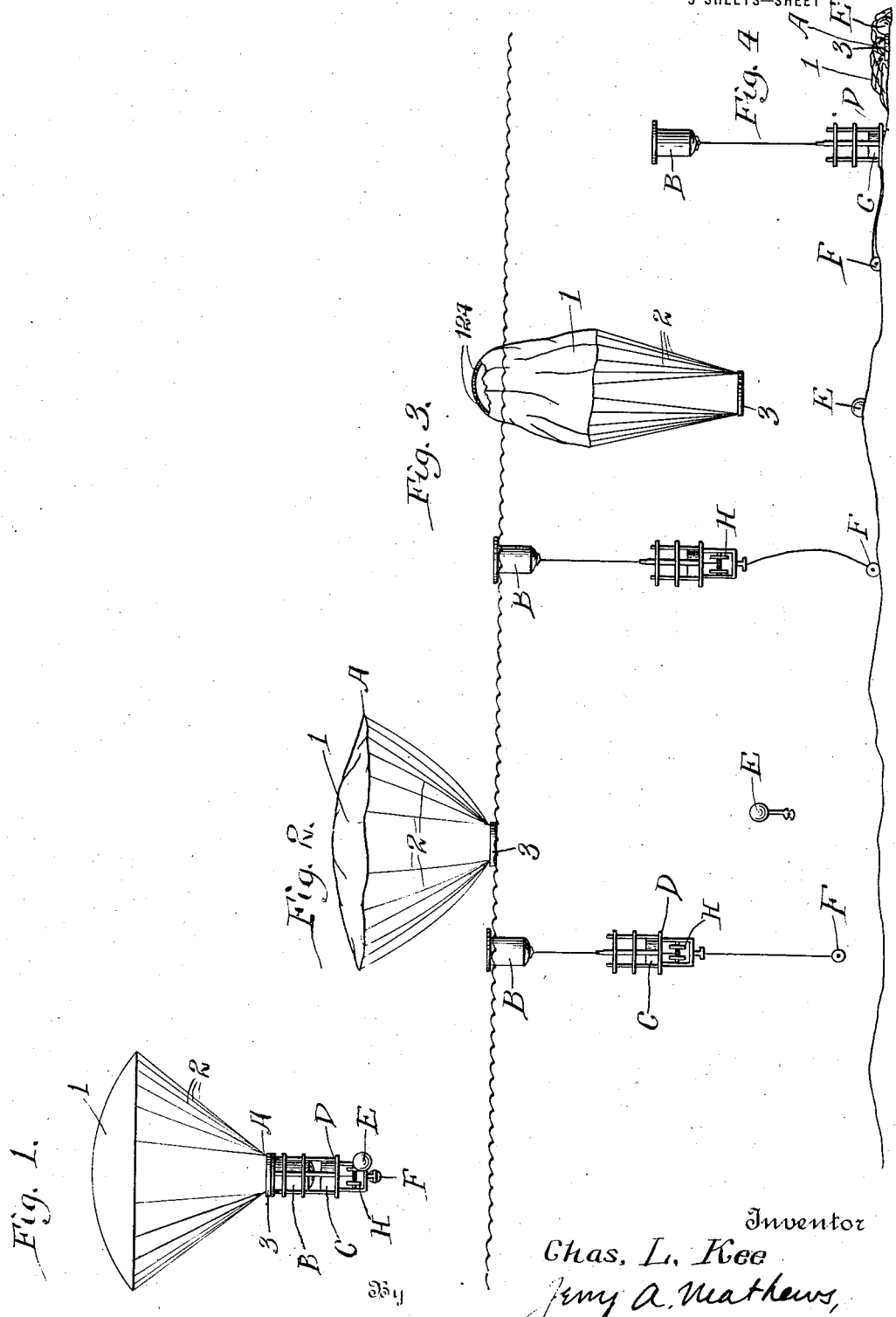

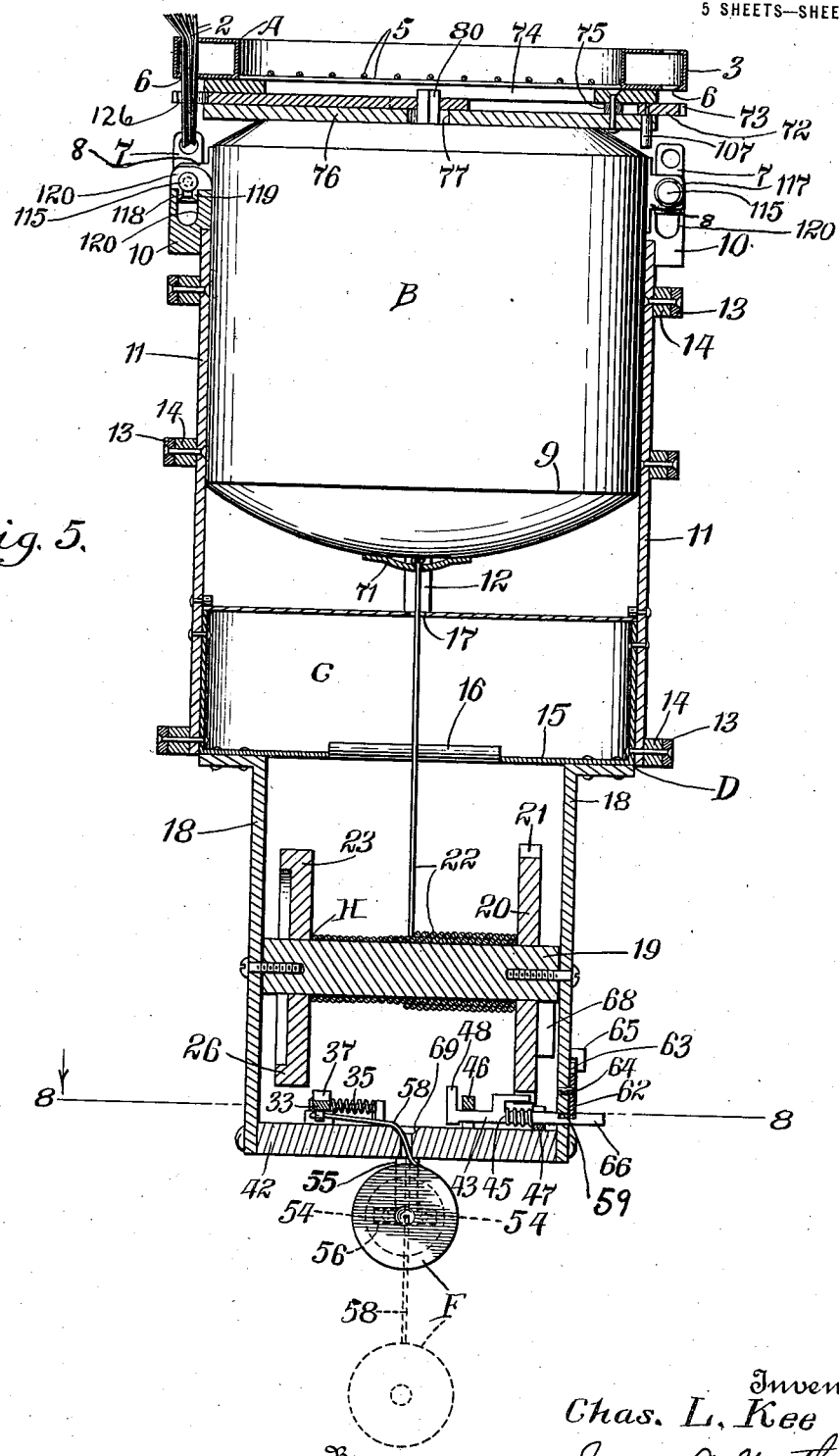

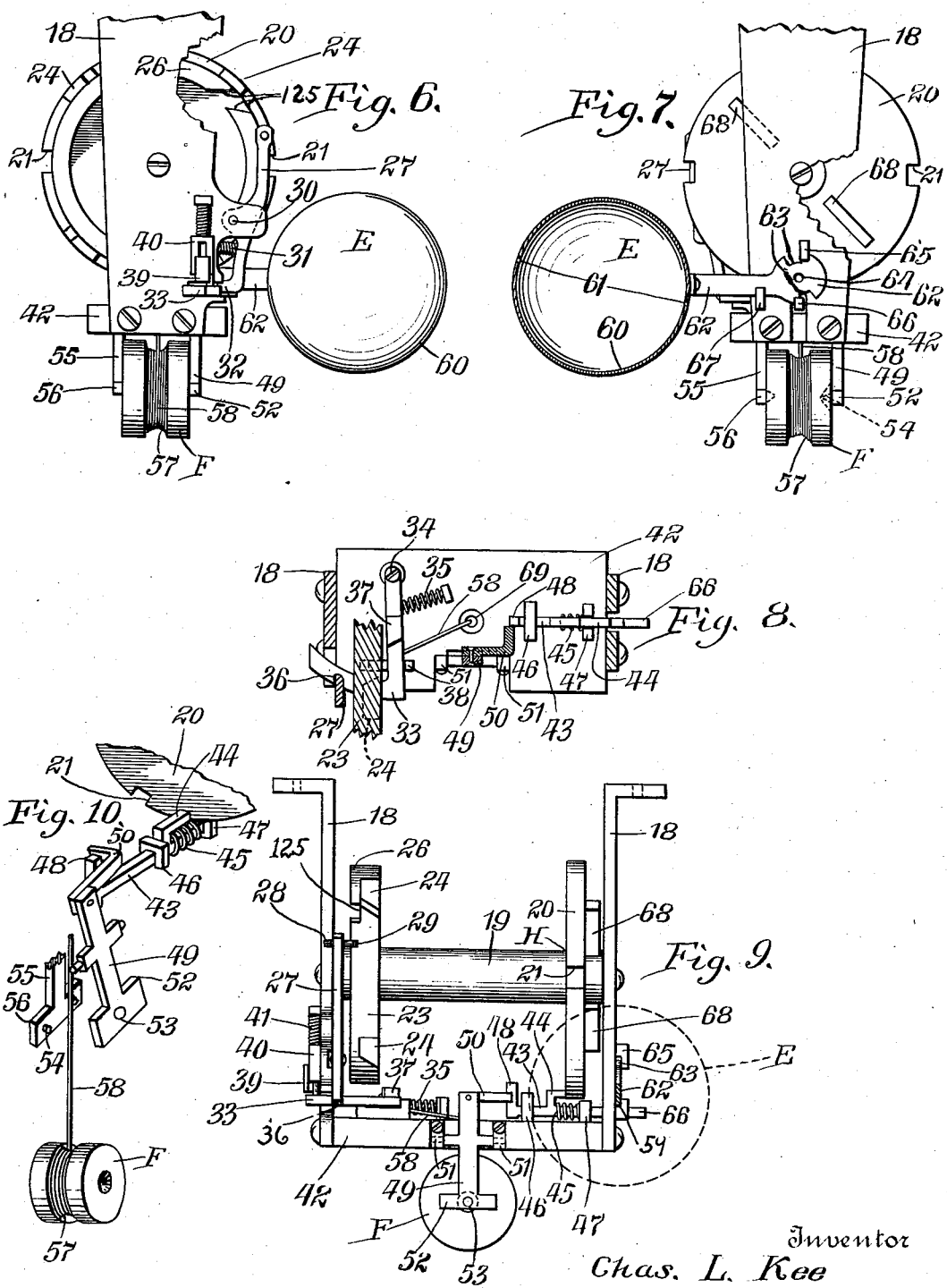

C. L. KEE.
AIRCRAFT PLANTED MINE AND ANCHOR.
APPLICATION FILED JUNE 1, 1917.

1,300,413.

Patented Apr. 15, 1919.
5 SHEETS—SHEET 4.

Inventor
Chas. L. Kee
Jerry A. Mathews,
Attorney

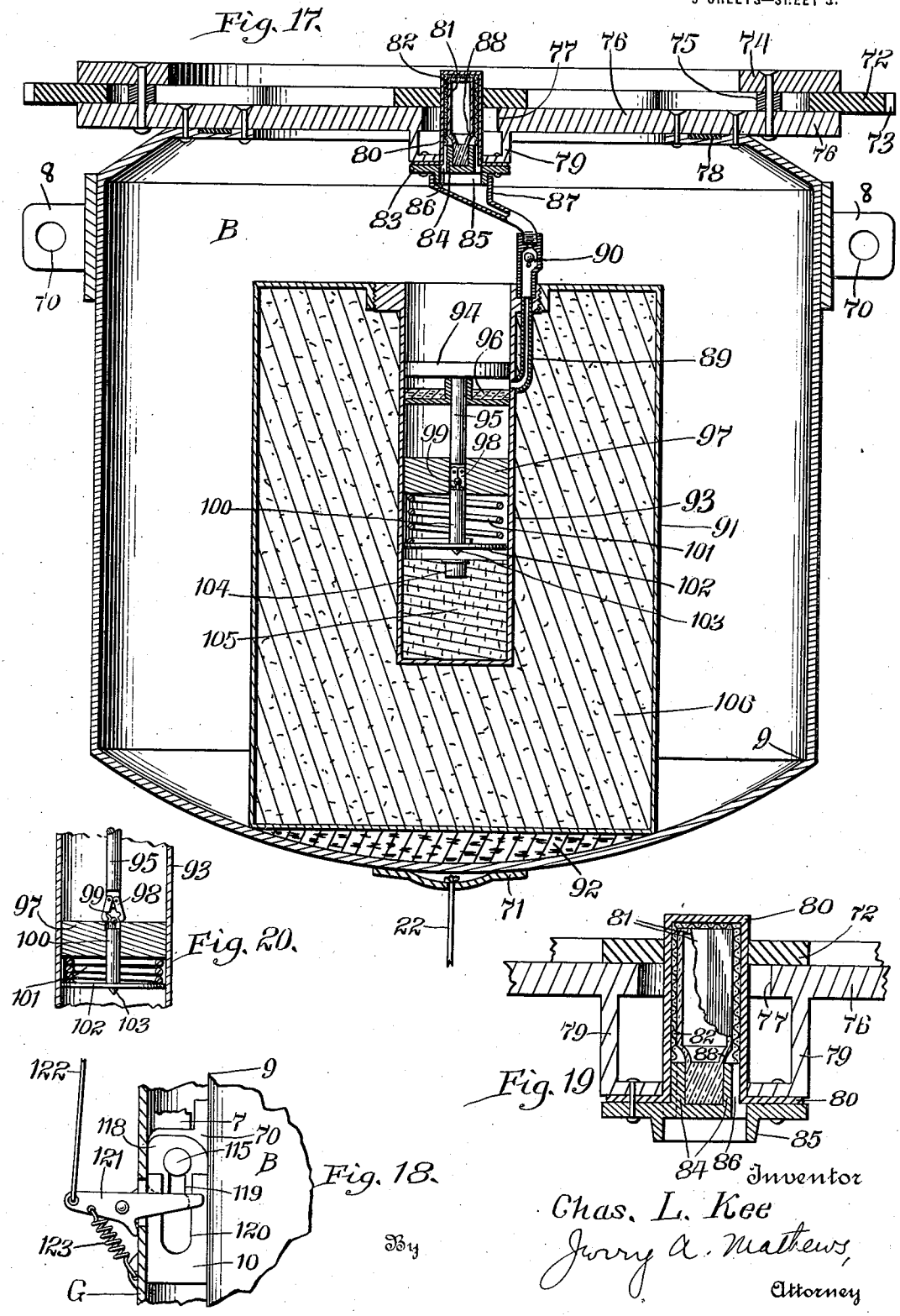

UNITED STATES PATENT OFFICE.

CHARLES L. KEE, OF PORTSMOUTH, VIRGINIA.

AIRCRAFT-PLANTED MINE AND ANCHOR.

1,300,413. Specification of Letters Patent. Patented Apr. 15, 1919.

Application filed June 1, 1917. Serial No. 172,173.

*To all whom it may concern:*

Be it known that I, CHARLES L. KEE, a citizen of the United States, residing at Portsmouth, county of Norfolk, and State of Virginia, have invented a new and useful Aircraft-Planted Mine and Anchor, of which the following is a specification.

The object of my invention is to provide a novel type of mine for offensive use which can be planted from aircraft in enemy country within the enemy's three mile limit. It is an object of my invention to provide such a mine which may be dropped from aircraft, and which on striking the water will automatically release itself from the parachute to which it is attached, and which will automatically anchor at any predetermined and desired distance below the surface of the water. It is further my object to provide a mine having the mechanism so arranged and exposed that it could not be pulled up for examination without the probability of being disarranged and broken before reaching the surface of the water. It is further my object to provide a novel type of anchor mechanism in which the center of gravity is very low so as to steady the mine and obviate any danger of its capsizing when it strikes the water. It is also my object to provide novel means for safely securing the parachute to the mine and anchor mechanism prior to its touching the water; to provide novel means for releasing the mine from immediate connection with the anchor and parachute; to provide novel means for automatically anchoring the mine at any required distance below the surface of the water regardless of the depth of the water into which the mine is dropped; to provide novel means for stopping the unrolling of the cable connecting the mine with the anchoring apparatus when the weight strikes the bottom; to provide novel means for retaining and releasing a weight from the anchoring mechanism at the proper time, and novel means for preventing the cable connecting the mine and anchor from unwinding too rapidly that the cable may not become entangled.

It is also my object to provide a novel combination and arrangement of parts to produce an efficient submarine contact mine which can be safely dropped from aircraft. It is also my object to provide a mine having novel combined chemical and mechanical detonating means specially adapted for operation in connection with the aircraft-planted mine of the anchored type which I have devised. It is also my object to provide novel means carried by the aircraft for releasing the entire device therefrom.

These and other objects of my invention will more fully hereinafter appear in connection with the following description and accompanying drawings in which—

Figure 12:
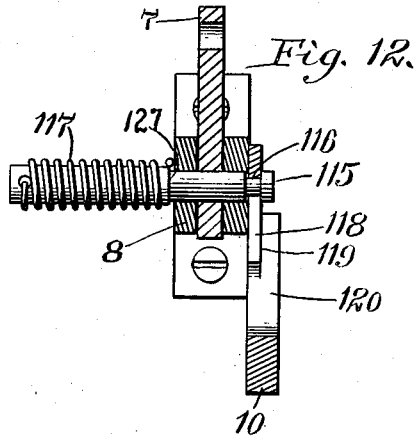
Figure 14:
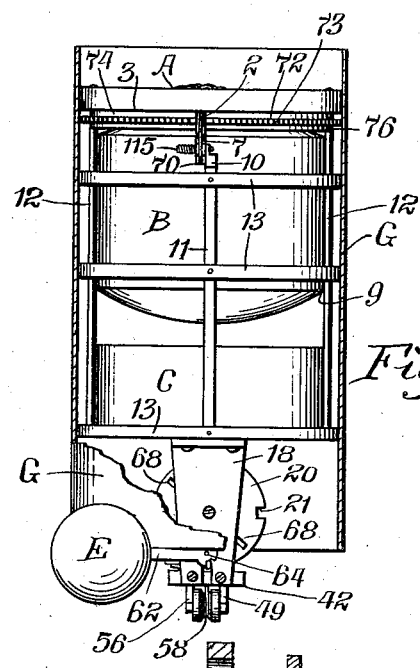
Figure 13:
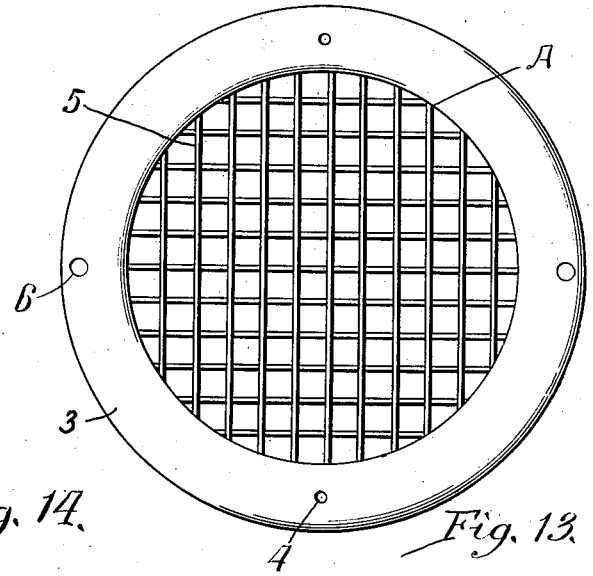
Figure 15:
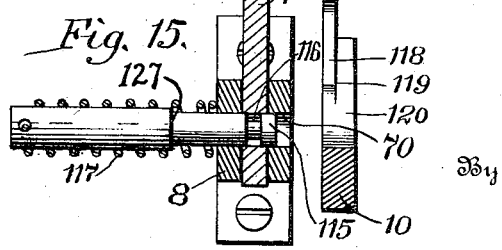
Figure 16:
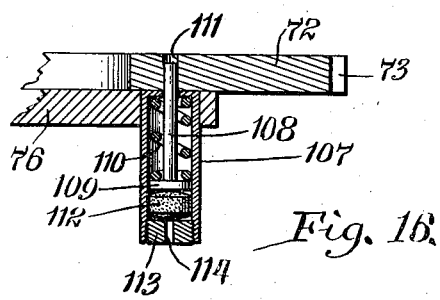

Figure 1 shows the entire device in the air after it has been released from the aircraft and before it strikes the water; Fig. 2 is a view of the entire apparatus in its initial operating position the moment after it strikes the water, and before any portion of its mechanism has touched the bottom; Fig. 3 is a similar view of the invention when the weight touches the bottom, and also illustrates the sinking of the parachute; Fig. 4 is a view of the mine and anchor in their final position submerged the required distance below the surface of the water; Fig. 5 is a vertical section through the anchoring apparatus and parachute float, the casing of the mine being shown in elevation; Fig. 6 is a side elevation of the lower part of the anchor with float attached; Fig. 7 is a side elevation of the lower part of the anchor viewed from the reverse side of the opposite bracket or arm, with member E shown in section; Fig. 8 is a fragmentary horizontal view as shown on line 8—8 of Fig. 5. Fig. 9 is a front elevation of the lower portion of the anchor apparatus; Fig. 10 is a detailed perspective view showing the sounding weight a moment after it has been released and the members from which it was released. Fig. 11 is a fragmentary top plan of the mine. Fig. 12 is an enlarged fragmentary vertical section of the parachute mine-releasing device in locked position. Fig. 13 is a top plan of the parachute temporary float. Fig. 14 is a view, partly in section and partly in elevation of the entire submarine mine, anchor and parachute, positioned within the tube carried by the aircraft and from which it is dropped; Fig. 15 is a vertical section similar to Fig. 12 but in a partially unlocked position; Fig. 16 is a fragmentary vertical section of the dissolvent locking device which prevents the mine from exploding while carried on aircraft, the water dissolving a tablet after it is submerged, unlocking the device; Fig. 17 is a vertical section of the mine; Fig. 18 is a detail of the releasing device by which the mine and anchor are dropped from the launching tube carried by the aircraft; Fig. 19 is an enlarged fragmentary section of the fragile acid chamber of the mine; Fig. 20 is a detailed sectional view, partly in elevation showing the detonating device at the moment members 98 have reached a position to release member 99.

Like numerals designate like parts throughout the several views.

Referring to the accompanying drawings:

I provide a suitable parachute A releasably secured to a suitable mine. Parachute A and mine B are releasably engaged to a novel anchor apparatus D which includes as an important portion a novel resistance chamber C. Releasably secured to the anchor is a weight F. The anchor apparatus D carries a cable spool H of novel construction which carries the cable 22 by which the mine B is anchored to anchor D. When the device is dropped from aircraft it is released through a suitable launching tube G. The various stages of its descent are illustrated in Figs. 1 to 4.

I provide a parachute envelop 1 which is attached by parachute cords 2 to a parachute temporary float 3, which is provided with apertures 4, as shown in Fig. 13, which permit water to gradually fill the float so that in a brief time it ceases to act as a float. Temporary float 3 is provided with a protective screen 5 to keep cords from parachute from getting tangled in the mine and anchor. The cords from the parachute envelop are threaded through openings 6 in float 3, and are secured to parachute retaining blocks 7 at opposite sides of the mine B, these blocks being releasably secured to lugs 8 mounted on opposite portions of mine chamber 9. I provide anchor retaining blocks 10, which likewise are releasably secured to lugs 8. Members 10 are secured to (or may be integral with) main supporting ribs 11, which alternate with suitable guiding ribs 12 of the anchor apparatus. Members 11 and 12 are retained in position by suitable guiding rings 13, which are attached to but spaced from members 11 and 12 by suitable washers 14. The lower portions of members 11 and 12 are attached to resistance chamber C. That element comprises a hollow casing 15, having an aperture 17 in its upper portion and upturned antifriction lips 16 in its lower portion, thus providing a slot for the passage of cable 22 from mine B to cable spool H.

Secured to casing 15 are hanger bars or brackets 18 between which is mounted the cable spool H. The latter element includes a spool shaft 19 having at one side a spool locking disk 20, in the periphery of which are any suitable number of locking slots 21 adapted to be engaged by member 44. At the opposite end of the spool shaft 19 is a spool stopping disk 23 of entirely novel construction and provided on its periphery with locking teeth 24, there being any suitable number of these teeth, and each having an inclined face, as illustrated in Fig. 9. These teeth are adapted to engage the correspondingly inclined face of tooth 37 and thereby stop and lock the cable spool to prevent further unwinding of the cable at the proper time.

The exterior side of spool stopping disk 23 is provided with an annular flange 26 which is provided with tangentially-disposed slot 125 to permit of the passage through said slot 125 of the projection or pin 29 carried by releasing lever 27, at the appropriate time operated by spring 31. Releasing member 27 is provided on its exterior portion with an outwardly extending projection or pin 28 which is arranged to engage against member 18 to prevent the movement of releasing member 27 inward beyond member 18. Releasing lever 27 is mounted by means of a suitable pivot 30 as shown in Fig. 6, and is controlled by a suitable spring 31. The lower portion of lever 27 is provided with an inwardly turned toe 32 which is adapted to engage in slot 36 of arcuate releasing arm 33 at the appropriate time. Member 33 as illustrated in Fig. 8 is pivotally mounted to anchor plate 42 by means of a suitable pivot 34. Its movement is controlled by spring 35. Member 33 is provided with the upwardly projecting block 37, having the inclined face shown in Figs. 8 and 9 and which is adapted to engage the correspondingly inclined faces of teeth 24 to lock the cable spool. As shown in Figs. 8 and 9 a suitable stop block 38 is provided on which arm 33 slides.

Mounted to hanger bar 18 is a spring 41 to which is attached a U-shaped vertically slidable stop or latch 40, one of its arms being extended to engage at the appropriate time in slot 36 of arcuate arm 33 to secure same against movement out of the position in which its upwardly projecting tooth 37 locks against the tooth 24 of the stop disk 23 of the cable spool. The U-shaped stop or latch 40 is retained in its proper position by a suitable guide member 39 of T-shape which is positioned between the arms of latch 40 and secured to bar 18. When the tension of weight F is released from member 33 the inclined face of tooth 24, on disk 23 of the rotating cable spool abuts against the inclined face of tooth 37 which projects upward from arm 33 which stops the cable spool from uncoiling any more cable and forces arm 33 over so that latch 40 engages in slot 36 and positively locks the cable spool in stationary position. Latch 40 is actuated by spring 41 and is guided by member 39. It provides a positive lock that obviates any possibility of an accident causing the mine to work loose from the anchor.

Anchor plate 42 and arms 18 are preferably of considerable thickness so as to materially increase the weight of the anchoring apparatus and to bring the center of gravity relatively low. Prior to the unwinding of the cable 22 from the cable spool H, just as the device reaches the water after being dropped from an aircraft the spool locking disk 20 is retained in locked position by the engagement of locking finger 44 in one of its peripheral slots 21. Finger 44 projects upwardly from locking latch 43 which is slidably mounted to anchor plate 42 by guide blocks 46 and 47. Member 43 is provided at its inner end with an upwardly projecting tongue 48, which before member 43 has moved from the position shown in Fig. 9, in which position the cable spool is locked, engages retaining arm 50 and thereby operates to releasably secure weight F to the pivotal support 49. The upper end of member 49 carries retaining arm 50 which may be secured to or made integral with that member. Member 49 is pivotally mounted to pivot blocks 51 as shown in Fig. 9. Member 49 is also provided with the alining arms 52, the function of which in coöperation with similar alining arms 56 of bracket 55 is to retain the weight in proper position so that it will be engaged by the two prongs 54 carried by arms 56 and by the single prong 53 carried by member 49 and cannot jar loose or revolve, and will be held close to the anchor plate until the inward movement of member 43 disengages tongue 48 from retaining arm 50 and thereby permits of a pivotal movement of member 49, thus disengaging prong 53 from the cavity in the side of the weight F into which prong 53 projects. The released position of member 49 is illustrated in Fig. 10. Member 43 when released is actuated by a latch spring 45, one end of which bears against guide block 47, as shown. The weight F is provided with an annular groove 57 of sufficient depth to permit line 58 one end of which is attached to the weight to be wound thereon. Line 58 may be of any suitable length, its length, however, determining the distance which the mine will be submerged beneath the surface of the water, as will later appear.

Member 43 is provided near its outer end with a slotted locking portion 59 into which the shank of float arm 62 projects up to the time the apparatus strikes the water and the float arm is raised and disconnected, thereby unlocking latch 43, which in turn releases the cable spool from locked position and disengages the weight F and allows it to drop as far as the length of line 58 permits.

Float arm 62 carries a suitable float member 60 by which the arm is operated and latch 43 unlocked so as to slide out through the notched portion 63 of member 62. Releasing float E is provided with suitable small orifices 61 opening into chamber 60 so that the chamber will after a few moments fill with water and allow the device to sink so as not to disclose the location of the mine after the device has served its purpose in operating the mechanism that releases the cable spool and weight F. I provide a suitable pivot 64 projecting through a corresponding opening in the shank of arm 62 on which that member pivots when the float strikes the water. Arm 62 is releasably supported against bracket 18 by short oppositely turned studs or fingers 65 and 66, the device, however, becoming disengaged from these studs owing to the presence of slotted portion 63 in arm 62 when it is raised. A suitable stop 67 is provided to prevent float arm 62 from dropping down too far when the apparatus is in locked position as shown in Fig. 7.

I provide suitable resistance vanes 68 mounted on disk 20 to prevent the cable spool from revolving too rapidly while the anchor is sinking, which if it were not guarded against might allow the cable to become entangled.

The anchor plate 42 is provided preferably at the central portion with an aperture 69 through which the line 58 extends. The end of line 58 is attached to the arcuate releasing arm 33 at any suitable portion of that member holding it in retracted position free from the cable spool as the weight of member F (though not great) is sufficient to overbalance the force of spring 35 exerted against lever 33. When the weight F strikes bottom and its weight is released from lever 33, that member is moved into locking position by spring 35.

Referring to Fig. 15 lugs 8 are provided with apertures 70 for the reception of a releasable fastening pin 115 by which the parachute, the mine, and the anchor device are releasably locked together by the weight of the anchor. Cable 22 is secured to a suitable plate or fastening member 71 which is secured to mine B, as shown in Fig. 17. The upper portion of mine B includes an acid releasing spider 72 which is provided with a serrated peripheral portion 73 so that it may the more readily be moved to break tube 81 and release the acid to fire the mine when struck by a vessel. This form of firing member is necessary for a mine of this type which is to be dropped from a cylindrical launching tube. The acid releasing member 72 which operates the firing member is movably mounted between the cover disk 76 of the mine and a retaining ring 74 spaced above the cover disk 76. It is capable of both rotative and sidewise motion so that a slight blow upon it from any direction will fracture the glass tube 81. Cover disk 76 is provided with an opening 77 through which the acid containing tube 81 extends. Members 74 and 76 are spaced apart by suitable washers 75. I provide a suitable washer 78 to make a water tight joint between cover 76 and the mine casing 9, as shown in Fig. 17. Cover disk 76 is provided with a circular central bracket 79. Secured between member 79 and member 83 is a flexible lead sheath 80 shaped to inclose the fragile acid tube 81 but separated therefrom by a suitable thin chain gauze 82. The function of member 82 is to prevent any pieces of glass from severing the lead sheath 80 when the firing member 72 is operated, which if it occurred would allow water to enter with and dilute the acid and possibly prevent the explosion of the mine. The fragile acid tube 81 and the encircling lead sheath 80 are of angular shape in cross section (preferably triangular).

The narrowed neck 88 of acid tube 81 is held stationary in the upper flange 84 of plate 83. Member 83 is provided with one or more passages 86 for the flow of the acid from acid tube 81 to funnel 87 which latter member has its enlarged end secured to the lower annular flange 85 of securing plate 83. The mouth of the funnel 87 is threaded or otherwise suitably connected to the lower acid tube 89 in which is interposed a suitable check-valve 90 to prevent the escape of gas through this tube when the acid mixes with the alkali in chamber 96. The gas evolved is confined so that its pressure will lift piston 94. Tube 89 opens into detonating cylinder 93.

Cylinder 93 extends down into the explosive container 91 which is filled with a high explosive (such as T. N. T.). The acid from tube 89 empties into an alkali chamber 96 containing a suitable alkali (such as phenol) and on mingling they evolve a gas which closes ball valve 90 and forces piston head 94 upward. Piston rods 95 and 100 are thereby drawn upward and raise disk 102. This operation compresses detonating spring 101 which bears against disk 102, as shown in Fig. 20. In consequence, as rod 95 is raised separating fingers 98 are released from their engagement in guide block 97 and thus are allowed to separate and disconnect from ball 99 on the upper end of lower piston rod 100. As will be apparent, disk 102 is thereupon driven downward by spring 101 causing detonating prong 103 to impinge upon percussion cap 104 which is embedded in explosive 105, which in turn detonates the high explosive 106.

Container 91 is mounted on any suitable bed (preferably of cork or sawdust) 92. However this may be omitted, and the container shaped to conform to the bottom of the mine casing 9. Container 91 is substantially smaller than mine casing leaving a surrounding air chamber that makes the mine buoyant.

Referring to Fig. 16, acid releasing member 72 is provided with one or more locking apertures 111 into which a locking piston rod 108 projects to prevent the mine from being exploded prematurely. The head 109 of member 108 rests on a soluble pellet 112 which rests on the apertured cylinder head 113 of locking cylinder 107 which is mounted to mine cover disk 76. A spring 110 presses against piston head 109 so that when the mine has fallen into the water, the water will enter aperture 114 and dissolve the soluble pellet 112 thus allowing the spring to act against member 109 to withdraw locking piston rod 108 from its engagement with aperture 111 of acid releasing member 72, so as to leave that member free to move and break the acid tube to fire the mine on contact with any external object, such as a vessel, provided the other locking mechanism is also released, as occurs the moment the mine strikes the water.

The other locking mechanism is wholly mechanical (anchor guide arms 11) and by means of guide rods 12 locks the mine, so that if cruising in the clouds the dampness should release the dissolvent lock, the mechanical lock will prevent any accidental discharge of the mine resulting from vibration of the aircraft. Referring to Figs. 12 and 15, member 10 is provided with an extension 120 terminating in a thin upper extension 118. Portions 120 and 118 of member 10 are provided with a slot 118 terminating in an enlarged annular portion at its lower end, as shown in Figs. 5 and 15. Parachute retaining block 7 depends between lugs 8 of the mine casing. Block 7 and block 10 (which is an integral part of the anchor guide arm 11) are held in engagement with lugs 8 by the locking pin 115. The slotted end 116 of pin 115 is engaged in the upper portion of the slot 118, this portion of the slot being of such size as to prevent release of the pin. The lower portion of the slot is of sufficient size to release the pin 115 when it is moved into alinement with that portion of slot 118. The operation of the device will be apparent by reference to Fig. 12. Pin 115 is provided with a shoulder 127 which abuts against lug 8, as shown in Fig. 12, to limit the movement of the pin to prevent any twisting movement of the apparatus. When block 10 is raised, as it will be due to the raising of the guiding arms 12 of the anchor in consequence of the resistance offered by the resistance chamber on entering the water, pin 115 is released through the enlarged portion of the slot 118 and also through apertures 70 of lugs 8 and also through the corresponding aperture in the parachute retaining block 7. This result follows from the expansion of spring 117 which is attached to and actuates pin 115 when the head of the pin is released from the narrowed portion of slot 118, thus withdrawing it from the parts mentioned and thereby releasing the parachute from the mine and the mine from immediate connection with the anchor. The cords attached to the parachute envelop are gathered together and secured to blocks 7, being guided through slots 126 in the firing or acid-releasing member 72.

Referring to Fig. 18, there is illustrated means for conveniently disengaging the mine from the launching tube G, which is an aluminum tube carried by the aircraft. I provide a trigger 121 to which is attached a suitable cord 122. The trigger 121 is normally held in place by spring 123, to support the mine. Its lugs 8 rest on trigger 121, as shown in Fig. 18, it being only required that the mine be supported at some suitable portion releasably within the launching tube. Cord 122 is manually operated by an operator on the aircraft.

Referring to Fig. 3, it will be observed that I provide apertures 124 in the envelop to allow the air caught under the parachute to escape after the parachute has struck the water, so that it may be sunk by the weight of member 3 after that member has filled with water and ceases to act as a float. The parachute cords are run through openings 6 of member 3 preferably, and thence through slotted portions 126 of member 72 and finally secured to blocks 7 as previously set forth.

Referring to Fig. 9 and Fig. 6 it will be observed that flange 26 of the cable spool disk 23 is provided with a tangential slot 125 through which pin 29 is permitted to pass when the cable spool has revolved sufficiently far to bring the slot under pin 29. When this occurs lever 27 is withdrawn from its engagement with arm 33 and ceases to act as a positive lock on that member. Were it not for this locking device, spring 35 would push member 33 into position to stop the cable spool before the weight F had become taut on line 58.

As this mine is for offensive use and intended for planting in the waters of enemy territory by aircraft its construction is such as to permit of its being light in weight. It is dropped from the aircraft with a parachute attached to check its descent through the air.

I provide an aluminum cylindrical tube G which is carried by the aircraft and is of suitable size for holding the mine until it is ready to be dropped. When it is to be released a cable 122 (shown in Fig. 18) is pulled by the operator, thereby operating a trigger carried by the launching tube G, and the mine and anchor are released and descend in the manner illustrated in Fig. 1 of the drawings. Up to the time the mine reaches the water the weight F is held by members 56 and 49 close to the anchor plate 42, the three prongs 54 and 53 preventing any rotary movement of the weight F. On touching the water the mine and anchor will automatically release themselves from the parachute, and the anchor will release itself from the mine, and anchor beneath the surface of the water at any predetermined distance, this depending upon the length of the cable attached to weight F. The parachute envelop which is provided with openings for the escape of air, will float a few minutes, and as member 3 first functions as a float and subsequently fills with water, which permits it to function as an anchor to the parachute, the parachute sinks.

Float E which is the initial operating member to set the train of various operations in motion when the mine strikes the water, functions first as a float, and subsequently fills with water and sinks. No evidence therefore is left of the location of the mine.

When the mine is dropped from an aircraft, the parachute, the mine and the anchor apparatus are all immediately connected together. When the mine first touches the water, the float E, by reason of its buoyancy floats thereby disconnecting the weight F and unlocking cable spool H of anchor, as will appear by reference to Fig. 7 of the drawings. Locking latch 43, which is actuated by spring 45, is released thereby simultaneously releasing its engagement with the adjacent disk of the cable spool and with the projecting arm of the pivoted member that supports one side of the weight F. Consequently the cable spool is allowed to begin to unwind and the weight F by reason of the movement of the pivoted member 49 to the position shown in Fig. 10 is allowed to drop.

The upper end of the line coiled around and attached to the weight F is secured to the spring-controlled arcuate arm 33, the weight of the weight F when hanging loosely being sufficient to overcome the force of the spring 35 and hold this arcuate arm 33 in retracted position. In such position its upwardly projecting tooth can not engage the radially projecting tooth of the adjacent disk of the cable spool, which it is adapted to contact with at a later stage in the operation of the mine.

In order that the arcuate arm 33 may, when the apparatus first strikes the water, be positively locked against any movement from its retracted position, so as to insure of sufficient time elapsing to enable the weight F to drop down to the full length of the line 58 and make its weight operative on the arcuate arm, there is provided a pivoted and spring-pressed lever 27 the lower end of which engages the slot in the arcuate portion of the arm 33 until the cable spool has revolved sufficiently to permit the pin or projection 29 at the upper end of lever 27 to move into and through slot 125 which is tangentially disposed through flange 26 of cable spool disk 23. The spring 31 causes this lever 27 to swing out of engagement with arcuate arm 33 as soon as the cable spool has revolved sufficiently to bring the slot 125 around to pin 29 said pin 29 passing entirely through slot 125 to a point within annular flange 26. Pin 28 functions to prevent the lever 27 moving too far.

The entire lower portion of the apparatus operates as an anchor, except that resistance chamber C temporarily functions as a float on striking the water. The effect of its function as a float is to offer resistance on striking the water, retarding the anchor while the momentum downward of the mine is not affected. The mine moves downward by gravity within the guide arms 11 thus carrying pin 115 from the locked position shown in Fig. 12 to the released position shown in Fig. 15. In this latter position it has moved to the enlarged rounded bottom portion of the slot in block 10 which is a part of or secured to the upper end of the guide arm 11. Consequently it is withdrawn through that slot and also through aperture 70 of the lugs 8 attached to mine casing 9, as well as the corresponding aperture in block 7 which is the member that fastens the parachute to the mine and anchor. Spring 117 which is attached to pin 115 causes it to fly out as will be apparent from reference to Fig. 15 of the drawings. When this has occurred the parachute is released from engagement with the rest of the device. The firing, or acid releasing spider, however is not free to move until the soluble pellet 112 has dissolved (which occurs in a few moments after the mine has struck the water). As will be apparent from Fig. 16, spring 110 forces pin 108 down out of engagement with the slot in acid-releasing spider 72 as soon as the soluble pellet dissolves.

Resistance chamber C operates primarily as a temporary float to check the descent of the anchor portion of the mine, on striking the water, sufficiently to allow the parachute mechanism and the explosive portion of the mine, the momentum of which is unchecked, to become disassociated from the anchor apparatus save for its distant connection with the cable spool by means of cable 22. Resistance chamber C rapidly fills with water, and the cable spool unwinds the cable as the anchor sinks. Chamber C thereafter acts as a part of the anchor.

The explosive portion of the mine, designated as B is buoyant, and temporarily remains on the surface of the water. Weight F having been released by the tilting of float E, and the releasing of the latches operatively connected with the arm of that float, has dropped as far as the length of line 58 attached to weight F permits, its weight retaining the arcuate arm 33 in retracted position as appears in Fig. 5 and Fig. 9, until the anchor apparatus has sunk to a point where weight F strikes the bottom of the sea.

The moment weight F strikes the bottom and the cord is relieved of its weight, arcuate arm 33 now being actuated by spring 35 is swung to a position where the inclined face of its upwardly projecting tooth 37 engages against and is stopped by the oppositely inclined face of the peripheral projecting tooth 24 of the adjacent disk of the cable spool. This obviously locks the cable spool against any further unwinding of the cable.

At this stage of the operation the main portion of the anchor apparatus is still above the bottom of the sea a distance equal to the length of the line attached to weight F, extending from its bottom plate to the weight F which has just struck bottom. Consequently as the anchor apparatus continues to descend for that distance, it, at the same time, pulls on the top cable 22, the upper end of which is secured to the bottom of the casing containing the explosive so that the mine is pulled down under the surface of the water for a distance equal to the length of the line attached to weight F. Line attached to weight F is of any predetermined length selected as the distance or depth desirable for anchoring the mine below the surface of the water.

As a safeguard against the accidental detonation of the mine in the event that the soluble pellet should be affected by the dampness in the atmosphere and dissolve before the mine strikes the water, I provide guiding ribs 12 of such length that their ends will project through orifices in the acid releasing spider 72, member 76 and member 74, as illustrated in Fig. 11, and parachute float 3, thereby preventing lateral movement of those members while not interfering with their vertical movement. Member 78 is a washer which prevents any water from entering the mine under mine cover 76.

The soluble pellet having dissolved and released the pin that previously held the acid-releasing spider rigid, leaves that member free to move in both a rotary and in a transverse direction when any floating body comes into contact with it. The spider 72 is loosely positioned between the ring 74 and the cover disk 76 and its triangular central slotted portion engages about the tube 80 which is of triangular shape in cross section. A very slight twist on the acid tube is sufficient to fracture it and allow the acid to flow down through the funnel 87, past check valve 90 and into the pocket 96 which contains an alkali; the effect is to evolve a gas which closes check valve 90 and forces piston head 94 upward, thereby withdrawing the depending arms 98 from block 97, allowing them to separate and release their engagement with ball 99 on the end of member 100, as shown in Fig. 20. When this occurs, spring 101 being compressed between disk 102 and block 97 operates to drive the disk downward so that its prong 103 will strike the percussion cap 104 in the explosive 105 in the bottom of cylinder 93, thereby detonating the high explosive (such as T. N. T.) 106.

It is within the contemplation of my invention to make such changes in the arrangement and combination of parts as do not depart from the principle which I have invented.

The mine described is a specially designed mine for planting from aircraft, and so not adapted for use in connection with anchoring devices heretofore employed, and my anchoring device is of entirely new type especially designed for use with this new type of mine, and in connection with which the usual form of mine could not be operated.

It is within the contemplation of my invention to employ any suitable explosives and any suitable means for effecting their explosion when the firing device is struck.

What I claim is:

1. A mine adapted to be planted by aircraft, comprising a parachute; means for floating the parachute on striking the water and subsequently sinking it; a submarine mine; a mine anchor; mechanical means releasably engaging the anchor with the mine and both those elements to the parachute; said means also engaging the firing member of the mine to prevent its accidental discharge; independent dissolvable fastening means releasably engaging the firing member of the mine with the cover of the mine to prevent its operation prior to submergence in the water; a resistance chamber carried by the anchor and adapted to first retard the sinking of the anchor to release the means fastening the mine, the anchor and the parachute in immediate engagement; means carried by the anchor for automatically controlling the depth at which the mine is to be anchored beneath the surface of the water; and buoyant means arranged to be operated on striking the water to set in operation the means for automatically controlling the depth at which the mine is to be anchored.

2. In combination with the device described in claim 1, a firing member arranged for both sidewise and rotary movement when released, an angularly shaped acid container of fragile material engaged by the firing member and arranged to be fractured by its movement, a high explosive carried by a container within the mine casing, a detonating explosive carried within a container within the container containing the high explosive, a percussion cap in the detonating explosive, spring actuated mechanical means for striking the percussion cap, an alkali chamber adapted to evolve a gas and actuate the aforesaid mechanical means when acid flows into the chamber upon the fracturing of the acid tube, a check valve to prevent the escape of gas from the aforesaid chamber, and means for protecting the acid container from the admission of water thereinto when it is fractured, substantially as set forth.

3. In a submarine mine with anchor attached adapted to be planted by aircraft, the combination of a submarine mine, an anchor releasably attached to the mine for anchoring it from the bottom of the sea, a parachute adapted to materially check the descent of the mine until it strikes the water to prevent premature explosion, and means for firing the mine, said means including an acid releasing member positioned in the upper portion of the mine, and successively operated chemical and mechanical means for detonating the mine when the acid is released, for the purposes described.

4. In a device of the class described, the combination of a submarine mine of cylindrical shape, a retarding parachute releasably attached to the mine, mechanical and chemical means for firing the explosive carried by the mine; said means including a firing member having projections on its peripheral portion; means for preventing accidental operation of the firing means prior to submergence of the mine in water, means for releasing the anchor mine and parachute from each other on striking the water, means carried by the anchor for automatically anchoring the mine at a predetermined distance below the surface of the water; and a buoyant member for releasing the aforesaid anchoring means when the device enters the water, substantially as described.

5. A submarine mine adapted to be planted by aircraft, including a parachute, a submarine mine, an anchor for the mine, means for holding the mine anchor and parachute in immediate engagement until the device has entered the water, mechanical and chemical means for firing the mine, said means being of light weight and adapted for use in an aircraft planted mine; means for preventing accidental discharge of the mine prior to its submergence in water; and means for automatically anchoring the mine at any desired distance below the surface of the water regardless of the depth of the water into which the mine is dropped.

6. A mine adapted to be planted by aircraft, including a parachute, a mine, an anchor for the mine, means operated when the mine strikes the water for disconnecting the anchor, mine and parachute, means mounted over the mine for firing same, means for preventing accidental firing of the mine prior to its submergence in water; and means for automatically anchoring the mine.

7. A submarine mine adapted to be planted by aircraft, including a parachute, a mine, an anchor adapted to be automatically controlled to anchor the mine at a predetermined distance below the surface of the water, and means operated when the mine strikes the water for disconnecting the mine from the parachute and the anchor from each of those elements.

8. A submarine mine adapted to be planted by aircraft, a parachute to check its descent through the air, and means releasably connecting the mine and parachute.

9. A submarine mine in combination with anchor apparatus of light weight adapted to automatically anchor the mine at any desired distance below the surface of the water regardless of the depth of the water.

10. A mine, an anchor adapted to be automatically detached from immediate connection with the mine on entering the water a parachute for checking the descent of the device through the air and means releasably connecting the mine and parachute.

11. The combination of a parachute, a submarine mine to which the parachute is connected, an anchor, a resistance chamber carried by the anchor and adapted to automatically disconnect the parachute, mine and anchor from immediate connection on entering the water.

12. An anchor for a submarine mine having a resistance chamber for retarding the sinking of the anchor on entering the water.

13. A mine adapted to be planted by aircraft, an anchoring frame releasably engaged to the mine, a resistance chamber contained within the anchoring frame, and means releasably connecting the anchoring frame and mine, whereby the force of inertia will disconnect the mine from immediate connection with the anchor on entering the water due to the resistance of the anchoring apparatus on entering the water caused by the buoyancy of the resistance chamber.

14. A submarine mine in combination with an anchor having a chamber that operates as a temporary float on entering the water and shortly after entering the water ceases to operate as a float.

15. A submarine mine, an anchor, means operatively holding the anchor and mine in immediate engagement, and a hollow buoyant member operatively connected to the aforesaid means for releasing the anchor from immediate connection with the mine on entering the water.

16. Means releasably fastening a parachute, a mine and a mine anchor in immediate engagement, comprising orificed members attached to the parachute, the mine and the anchor respectively, and a spring controlled pin releasably projecting through the orifices in the aforesaid orificed members.

17. Means releasably fastening a parachute, a mine and an anchor for the mine in immediate engagement, comprising orificed lugs attached to the mine, an orificed block suspended from the parachute, and an orificed guide bar constituting a portion of the anchor, and spring controlled means releasably retaining the aforesaid members in engagement until the weight of the anchor is released and thereupon disengaging the spring-controlled fastening means from the aforesaid members.

18. A device for holding a parachute, a mine and an anchor in immediate engagement and for disconnecting the aforesaid members when the anchor strikes the water, comprising an orificed block suspended from the parachute, orificed lugs secured to the mine, and an orificed bar constituting a portion of the anchor, the orifice in the latter member being enlarged and rounded at its lower end, a spring actuated pin projecting through the aforesaid orificed members and securing them in engagement, the pin having a grooved portion engaged by the narrowed slotted portion of the anchor member when the anchor is depending from the pin, the head of the pin being of such size as to be released through the enlarged portion of the slot in the anchor element when pin is moved to a relatively lower position in the key-shaped slot, as and for the purposes described.

19. In a mine adapted to be planted by aircraft, the combination of a mine and anchor, a parachute releasably attached to the mine and anchor, a temporary float member suspended from the parachute, said member comprising a hollow ring having openings for the gradual admission of water, and having a screen extending across it to prevent the parachute from becoming entangled in the mine when that element enters the water.

20. A mine adapted to be planted by aircraft, having a parachute releasably attached thereto, the parachute envelop having apertures for the escape of air to permit of the sinking of the parachute envelop, whereby to conceal the location of the submerged mine.

21. An aircraft-planted weapon of the class described, comprising an anchor for anchoring the mine from the bottom of the sea, a submarine mine, a parachute for checking the descent of the mine through the air to a considerable extent, and means actuated on striking the water for releasing the anchor from immediate attachment to the mine, for the purposes described.

22. In combination with a mine, an anchor releasably attached to the mine, a cable spool carried by the anchor, a cable carried by the cable spool and having one end attached to the mine, projecting teeth on a disk of the cable spool said teeth having one of their faces inclined, a weight controlled member having a projecting tooth, said tooth having an inclined face corresponding with the inclined face of the projection of the cable spool to lock in engagement with same, and a weight operatively connected with the weight controlled member.

23. In combination with the apparatus described in claim 22, resilient means pressing against the weight controlled member, and a positive locking device for engaging the weight controlled member and positively locking it when it has moved into position to stop the cable spool.

24. As a new article of manufacture, a buoyant operating member for a mine, consisting of a hollow buoyant element, said element having orifices for the gradual admission of water to cause it to sink after a short period, and an arm attached to the buoyant element, the shank of the arm having slotted portions positioned to permit of its release from other mechanism on striking the water, the arm also having an orifice to permit of its pivotal connection with other mechanism.

25. As a new article of manufacture, a weight for a submarine mine having a grooved annular portion for the winding of cable thereon, and having a single cavity on one side and a plurality of cavities on the opposite side, whereby the weight is prevented from rotating when engaged at its cavity-formed portions.

26. In combination with a mine of the class described, a device for first preventing a parachute envelop from sinking on striking the water and subsequently causing it to sink, consisting of a hollow chamber to which a retarding parachute is attached, said chamber having apertures for the gradual admission of water, and having a screen member extending across the opening in the central portion of said chamber to prevent ropes or parachute cover from becoming entangled with the mine to which the device is releasably attached, and the aforesaid retarding parachute, substantially as described.

27. As a new article of manufacture for use on a mine anchor, a cable spool having projecting vanes adapted to prevent too rapid unwinding of the cable carried by the cable spool.

28. As a new article of manufacture for use on a mine anchor, a cable spool having an annular flange on one of its disks, said flange having a tengentially disposed slot extending therethrough for the passage of a releasing member.

29. As a new article of manufacture for use on a mine anchor, a cable spool having a projecting tooth on one of its disks, the tooth having an inclined face to lock against the corresponding face of a stopping member carried by the anchor.

30. As a new article of manufacture for use on a mine anchor, a cable spool, one of the disks of the cable spool having an annular flange, the annular flange having a tangentially disposed slot extending through same, to permit of the release therethrough of a projecting member carried by the anchor at a stage in the revolution of the cable spool.

31. As a new article of manufacture, a releasing device for releasing an anchor from a mine, consisting of a pin having an annular grooved portion releasably engaged to one of the members that are releasably held in engagement, the pin carrying a spring arranged to engage against the other member.

32. In combination with a firing member for a mine, dissolvent fastening means, comprising a pin projecting into the opening in the firing member, a soluble pellet supporting the pin in engaged position with the firing member, a spring arranged to press the pin out of engagement with the firing member when the soluble pellet dissolves, and a container for the pin pellet and spring, said container having an opening to allow water to enter to dissolve the soluble pellet, for an aircraft-planted mine.

33. As a new article of manufacture, a mine anchor having a temporary flotation chamber, said chamber comprising a hollow body having openings for the passage of a cable through same, said openings also serving to gradually admit water to the chamber, whereby the sinking of the anchor is at first retarded on striking the water.

34. A mine adapted to be planted by aircraft, comprising a parachute having apertures in its envelop, screening for preventing the parachute from becoming entangled with other parts of the apparatus, a hollow apertured floating member releasably engaged to the mine and adapted to sink the parachute a short period after entering the water, a submarine mine containing a high explosive within an inner container and having mechanical and chemical means for detonating the high explosive, said means including a movable firing spider having its outer portion projecting beyond the periphery of the mine, a fragile acid containing member of such shape as to be fractured by movement of the firing spider, chemical means for operating a mechanical device for striking a percussion cap when the acid is released, a detonating explosive in which the percussion cap is embedded, a high explosive adjacent to which the detonating explosive is located, dissolvent-controlled locking means arranged to prevent movement of the firing spider prior to the submergence of the device in water, a mine anchor having arms engaging and locking the firing spider against movement until the anchor is disconnected from the mine, other arms releasably engaging the anchor to the mine and to the parachute mechanism, a resistance chamber carried by the anchor and adapted to operate as a temporary float to resist submergence of the anchor without checking the downward movement of the mine when the anchor strikes the water a spring pressed locking pin adapted to be disconnected from its locking engagement with the arms of the anchor the mine and the parachute mechanism when the resistance chamber of the anchor enters the water, a hollow apertured buoyant member releasably engaged with the anchor and arranged to release a latch when raised from its normal position on entering the water, a cable spool carried by the anchor, the spool having slotted portions for releasable engagement with the latch, a spring to move the latch out of engagement with the spool when released by the buoyant member, a weight, members releasably supporting the weight operatively engaged to the aforesaid latch, a line attached to the weight at one end and secured to a pivoted arm at the other, the arm having a projection, the cable spool having a corresponding projection on one of its disks to stop the rotation of the disk after the tension of the weight has been released on striking the bottom, a spring pressing against the pivoted arm to move same into engagement with the projection carried by the cable spool, a positive locking member adapted to engage and lock the pivoted arm after it has moved to position to stop the disk, and an annular flange on one of the disks of the cable spool, said annular flange having a tangential slot, a pivoted lever bearing against the annular flange at one end and against the pivoted arm at the other to positively prevent the pivoted arm from moving to a position to stop the rotation of the cable spool before a predetermined rotation of the cable spool, whereby the weight is given time to drop and exert tension against the pivoted arm to hold it in retracted position until the weight touches bottom.

35. A mine adapted to be planted by aircraft comprising an explosive flotation chamber, said chamber being partially hollow and containing an explosive substance, mechanical firing mechanism for detonating said explosive substance, means for operating said mechanical firing mechanism by means of chemicals caused to react upon one another when the mine is struck by any external object to cause the explosive to be detonated.

36. In combination with a mine adapted to be planted by aircraft, anchoring means having as its principal elements a self-locking cable spool having projecting angular shaped teeth, and a locking lever having a projecting correspondingly shaped angular tooth adapted to be thrown into full locking position by the momentum of the spool when the locking lever is released from retracted position.

37. In combination with a mine adapted to be planted by aircraft, anchoring means having as its principal elements a self-locking cable spool having a projecting angular shaped tooth disposed on the periphery of one of the disk portions of the cable spool, a locking lever having a projecting correspondingly shaped angular tooth adapted to coöperate with the spool teeth and be thrown into locked position against the spool by the momentum of the latter, a weight member of relatively small size having a cable attached to it, the cable being secured to the locking lever to hold it in retracted position until the weight strikes bottom, and a relatively light spring bearing against the locking lever to insure its movement to a position to engage the angular teeth of the cable spool.

38. A submarine mine adapted to be launched from aircraft comprising, in combination, a mine, means to check the descent of the mine until it reaches the water, means for releasing said checking means when it reaches the water, and means for anchoring the mine at a predetermined distance below the surface of the water.

39. A submarine mine adapted to be launched from aircraft comprising, in combination, a mine; means to check the descent of the mine until it reaches the water; means for automatically anchoring the mine at a predetermined distance below the surface of the water; means for locking said mine, said checking means and said anchoring means together as a unit; and means for releasing said locking means when the said submarine mine reaches the water.

40. A submarine mine adapted to be launched from aircraft, in combination with means for checking the descent of the mine until it touches the water, means adapted to anchor the mine from the bottom of the sea, and means for automatically detaching the aforesaid mechanisms from immediate connection with each other on reaching the water, for the purposes described.

CHARLES L. KEE.